United States Patent

Christie et al.

(10) Patent No.: US 7,121,557 B2
(45) Date of Patent: Oct. 17, 2006

(54) SELF-SEALING PASS-THROUGH PLATE

(75) Inventors: Michael Christie, Columbus, OH (US); Richard G. Novak, Ravenna, OH (US); Jeffrey J. Blake, Ravenna, OH (US); Ronald A. Moner, Twinsburg, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/382,710

(22) Filed: Mar. 5, 2003

(65) Prior Publication Data

US 2003/0178787 A1 Sep. 25, 2003

Related U.S. Application Data

(60) Provisional application No. 60/365,955, filed on Mar. 19, 2002.

(51) Int. Cl.
*F16L 5/02* (2006.01)
*H02G 3/22* (2006.01)

(52) U.S. Cl. ............... 277/606; 277/616; 277/627; 277/652; 277/917; 285/3; 285/4; 174/67; 174/151

(58) Field of Classification Search ........... 277/606, 277/616, 627, 917, 652; 285/124.3, 2–4; 165/173; 174/66, 67, 65 R, 65 G, 151, 153 G, 174/152 G
See application file for complete search history.

(56) References Cited

U.S. PATENT DOCUMENTS

| | | | | |
|---|---|---|---|---|
| 2,800,242 A | * | 7/1957 | Sauthoff | 220/3.8 |
| 2,813,692 A | * | 11/1957 | Peterson et al. | 248/56 |
| 2,820,088 A | * | 1/1958 | Sperry | 174/153 G |
| 2,956,822 A | * | 10/1960 | Kates | 285/124.3 |
| 3,447,603 A | * | 6/1969 | Jones | 165/178 |
| 3,448,986 A | * | 6/1969 | Dial et al. | 277/596 |
| 3,471,178 A | * | 10/1969 | Roe | 285/124.3 |
| 3,473,913 A | | 10/1969 | Meyers et al. | |
| 3,503,634 A | * | 3/1970 | Cadiou | 285/124.3 |
| 3,654,965 A | * | 4/1972 | Gramain | 138/89 |
| 3,721,452 A | * | 3/1973 | Black | 277/609 |
| 4,103,923 A | | 8/1978 | McDowell | |
| 4,159,035 A | * | 6/1979 | Chartet | 165/173 |
| 4,272,085 A | | 6/1981 | Fujikawa et al. | |
| 4,538,819 A | * | 9/1985 | Wagner et al. | 277/606 |
| 4,635,949 A | | 1/1987 | Lucas et al. | |

(Continued)

FOREIGN PATENT DOCUMENTS

WO PCT/DK91/00225 4/1993

*Primary Examiner*—Alison K. Pickard
(74) *Attorney, Agent, or Firm*—John A. Molnar, Jr.

(57) ABSTRACT

A plate for passing a member from a first side of the plate through to a second side of the plate. The plate includes a retainer having a first surface on the first side of the plate, and a second surface on the second side of the plate. The retainer has one or more ports formed therethrough, at least a first one of the ports having an inner diametric extent configured to receive the outer periphery of the first member therethrough. A layer of an elastomeric material is provided on the first surface of the retainer across at least the first one of the ports. The layer is formed as having a first imperforate portion closing the first one of the ports, which first imperforate portion is openable for receiving the outer periphery of the first member through the inner diametric extent of the first one of the ports.

20 Claims, 5 Drawing Sheets

U.S. PATENT DOCUMENTS

| | | | |
|---|---|---|---|
| 4,746,023 A | * | 5/1988 | Belter .................. 277/637 |
| 4,834,173 A | * | 5/1989 | Weiss et al. ............ 165/159 |
| 5,286,040 A | * | 2/1994 | Gavin .................. 277/606 |
| 5,567,916 A | * | 10/1996 | Napiorkowski et al. 174/153 G |
| 5,890,719 A | | 4/1999 | Bettencourt |
| 5,954,345 A | * | 9/1999 | Svoboda et al. ......... 277/626 |
| 6,029,981 A | * | 2/2000 | Hawley et al. .......... 277/607 |

* cited by examiner

SELF-SEALING PASS-THROUGH PLATE

CROSS-REFERENCE TO RELATED CASES

The present application claims the benefit of the filing date of U.S. Provisional Application Ser. No. 60/365,955; filed Mar. 19, 2002, the disclosure of which is incorporated herein by reference.

BACKGROUND OF THE INVENTION

The present invention relates broadly to manifold and other "pass-through" plates, and more particularly to a such a plate having one or more ports allowing one or more of hoses, tubing, wiring, control lines, cables, fiber optics, and the like to be pass from a first side of the plate through to a second side of the plate, on one or both sides of the plate may be a contained environment.

When lines such hose, tubing, wire, cable, or fiber optics must extend from one environment to another, contained environment, or access otherwise must be provided between the two environments, means must be provide to seal the contained environment. For example, in transportation or other mobile applications such as for construction or agricultural equipment, hoses, tubing, wiring, and the like may have to pass through the firewall or other wall of the vehicle from the exterior or a space such as the passenger compartment, and into another space such as the engine compartment. Heretofore, a plastic or metal plate was used to seal the opening between the spaces. The plate was formed having a number of ports, into each of which was fitted a rubber grommet for sealing around the tubing, hose, or wiring pushed through the port. Each of the grommets typically had to be manually fitted into a corresponding one of the ports in the plate, thereby making for a labor intensive assembly. Alternatively, a pair of plates were provided, one on each side of the opening, with the grommets being sandwiched in between the plates.

It is believed that improvements in the construction of manifolds and other passthrough plates for hoses, tubing, wiring, control lines, cables, fiber optics, and the like would find utility in a variety of mobile applications, and in other applications such as in industrial or commercial hydraulic, pneumatic, or other fluid power transport or control, or in chemical processing, power generation, food processing, and other operations. A preferred construction would be economical to manufacture, but also would afford reliable sealing and would be adaptable to seal a variety of different pass-through arrangements.

BROAD STATEMENT OF THE INVENTION

The present invention is directed to a manifold or other "pass-through" plates, which may be configured as a panel or cover, and more particularly to a such a plate having one or more ports allowing one or more of hoses, tubing, wiring, control lines, cables, fiber optics, and the like to be pass from a first side of the plate through to a second side of the plate, on one or both sides of the plate may be a contained environment. The plate includes a retainer, which may be formed of metal, plastic, wood, glass, or other material, and which is generally configured to cover or otherwise extend across or substantially across an opening between a first environment or other space and a second environment or other space, one of which spaces or environments may be sealed or otherwise contained. The retainer has a first and a second surface each of which forms or is otherwise on a corresponding one of the sides of the plate, and which together define a thickness dimension of the retainer therebetween. One or more ports are formed therethrough that thickness dimension for the passage of a member having an outer periphery, such as a length of tubing, from the space on one side of the plate through to the space on the other side of the plate.

In accordance with the precepts of the present invention, on at least one of the retainer surfaces is overmolded or otherwise formed a layer of an elastomeric material which extends on such surface across at least one of the ports in forming an imperforate portion which is removable to open the port and allow the member to pass therethrough, and, optionally, a seal portion which extends around the port for forming a fluid-tight seal between the plate and the member being passed through the port which has been opened. Advantageously, the layer of the elastomeric material may extend across multiple ports formed in the retainer so as to allow for various combinations of ports to be selectively open or closed depending upon the requirements of the intended application. Such a construction also is economical in eliminating the necessity of having to provide each of the ports with separate grommets or other sealing elements. These and other advantages of certain aspects of certain of the one or more embodiments illustrated herein will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" or "horizontal" and "axial" or "vertical" referring, respectively, to directions, axes, planes perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the precepts of the passthrough plate of the present invention are described in conjunction with its adaptation for an use a manifold plate such as to receive tubing, hoses, cables, and wiring through the firewall of a tractor/trailer rig or other vehicle. In view of the discourse to follow, however, it will be appreciated that aspects of the present invention may find utility in variety of transportation, industrial, commercial, and other applications such as a manifold plate for hydraulic, pneumatic, or other fluid power or control lines, or for wires, sensors, cartridges, or other componentry within electrical control panels such as for explosion or fire proof or cabinets or other enclosures. Use within those such other applications therefore should be considered to be expressly within the scope of the invention herein involved.

Figure 1:
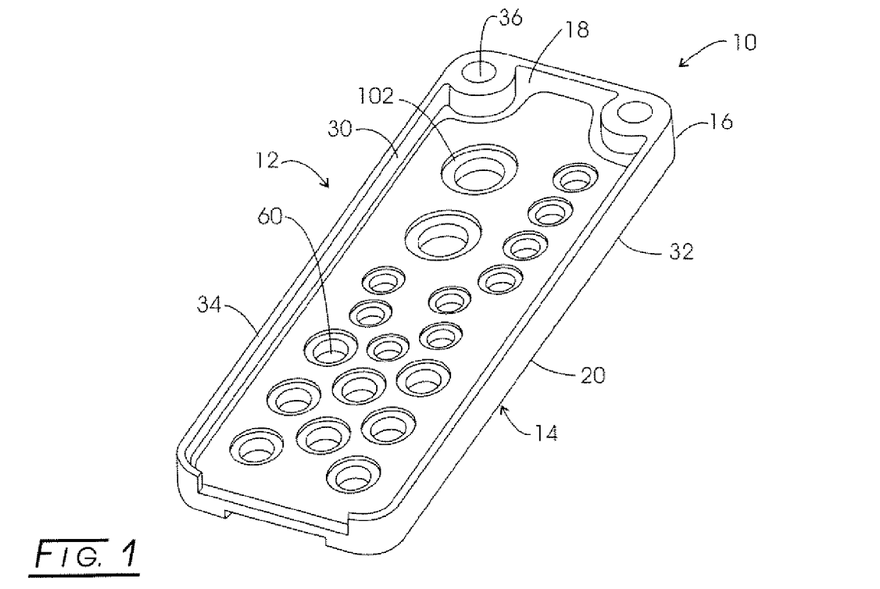
FIG. 1 is a perspective view showing one side of a pass-through plate constructed in accordance with the present invention.
Figure 2:
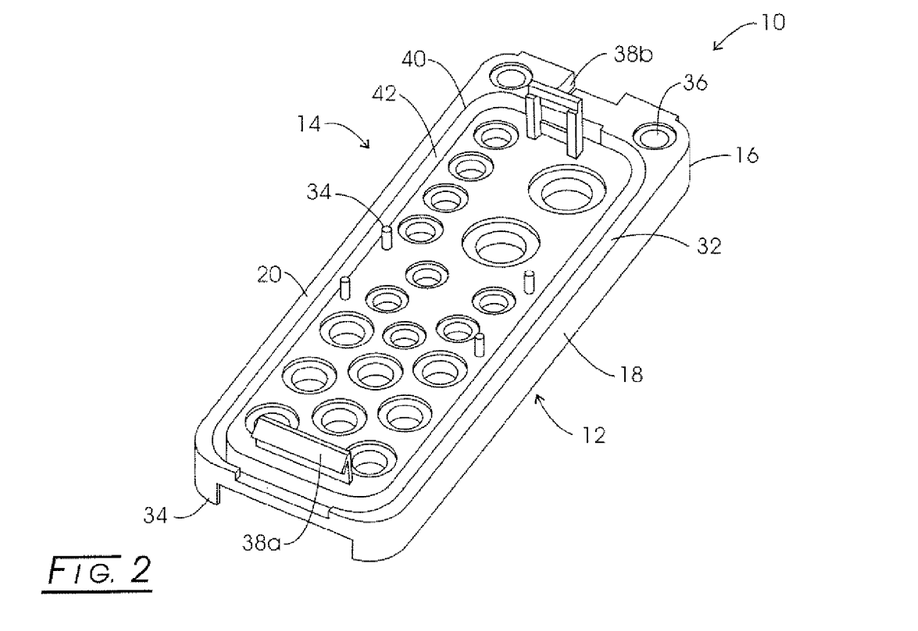
FIG. 2 is a perspective view showing the other side of the plate of FIG. 1.
Figure 3:
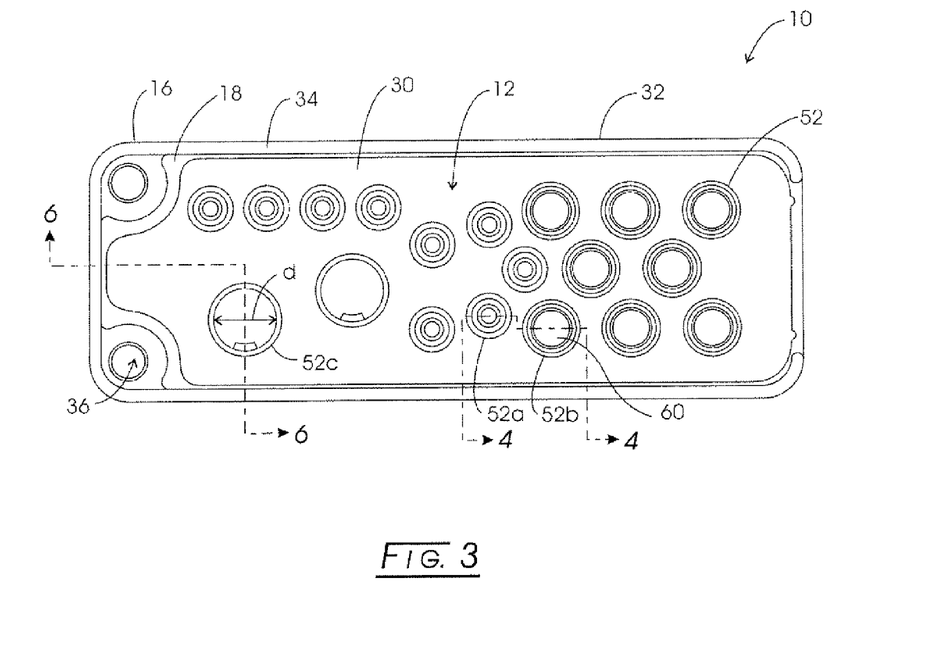
FIG. 3 is a top view of the plate of FIG. 1.

Referring then to the figures wherein corresponding reference characters are used to designate corresponding elements throughout the several views with equivalent elements being referenced with prime or sequential alphanumeric designations, a representative pass-through plate according to the present invention is shown generally at 10 in the perspective views of FIGS. 1 and 2, and in the top view of FIG. 3, for passing one or members (see FIGS. 8–9) which may be, for example, one or more, or a combination of, hoses, tubing, wiring, control lines, cables, fiber optics, sensors, probes, sampling devices, or other members, devices, or components from a first side, 12, of the plate 10 through to a second side, 14, of the plate 10. In basic construction, plate 10 includes a retainer, 16, having a first surface, 18, on the plate first side 12, and a second surface, 20, on the plate second side 14, each of which surfaces 18 and 20 may be generally planar as shown or, alternatively, concave, convex, complex curved, or other shape or profile, and a generally conformal layer, 30, of an elastomeric material extends on at least one of the surfaces 18 and 20, such as the surface 18 as shown. As may be seen best with momentary reference to the cross-sectional views of FIGS. 6–7, depending upon the material of construction of retainer 16, which may be metal, plastic, or other, the surface 18 receiving the layer 30 may be molded, machined, or otherwise formed as having a recess or cavity, referenced at 31 in FIGS. 6 and 7, within which the layer 30 may be contained.

Metal materials which may be suitable for the construction of retainer 16, which generally will be more rigid than the elastomeric layer 30, include aluminum, steel, stainless steel, magnesium, copper, brass, titanium, nickel, and alloys thereof, but as may be selected specifically for reasons of cost, weight, corrosion or temperature resistance, strength, and other chemical, physical, mechanical, or electrical properties. For reasons of cost and ease of manufacture, a plastic material, however, may be preferred. Suitable plastics may include thermoplastics and other injection moldable polymeric materials such as a poly(ether ether ketones), poly- imides, polyamides, nylons, fluoropolymers, polyolefins such as high molecular weight polyethylenes and polypropylenes, polyurethanes, polyetherimides, polybutylene terephthalates, polystyrenes, acrylics, vinyls such as polyvinyl chloride and polyvinyl acetate, fluoropolymers, polysulfones, thermoplastic polyesters, polycarbonates, acrylonitrile-butadiene-styrene, polyphenylene ethers and oxides, acetal homo or copolymers, liquid crystal polymers, and copolymers and blends thereof, but also may include thermosetting resins such as thermosetting polyesters and polyurethanes. Depending upon its material of construction, retainer 16 my be stamped, machined, cast, injection, compression, or otherwise molded, or otherwise formed.

Elastomeric materials which may be suitable for layer 30, but as again which may be selected specifically for reasons of cost, weight, corrosion or temperature resistance, strength, and other chemical, physical, mechanical, or electrical properties, or for compatibility with the material of the retainer 16, include natural rubbers such as Hevea, as well as thermoplastic, i.e., melt-processible, or thermosetting, i.e., vulcanizable, synthetic rubbers such as fluoropolymers, chlorosulfonate, polybutadiene, polybutadiene, buna-N, butyl, neoprene, nitrile, polyisoprene, silicone, fluorosilicone, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation.

Layer 30 may be molded or overmolded by injection, which may be vacuum-assisted, 2-shot, insert, and/or rotational, compression, or injection-compression molding directly onto the retainer surface 18. Alternatively, layer 30 may be first molded, thermoformed, cast, stamped, or otherwise formed and then attached to the retainer in a separate operation. Whether overmolded on or otherwise formed and attached to retainer 16, layer 30 may be retained thereon to form an integral structure of the plate 10 by chemical, adhesive, fusion, or other such forces, or by an interfering mechanical engagement such as in the manner to be described hereinafter. To assist in the bonding of the layer 30 to the retainer 16, such as in the case of otherwise chemically incompatible materials, the retainer surface 18 may be primed with a siloxane, silane, or other bonding agent, or one or both of the materials forming the retainer and layer may be formulated with a modifier or other adhesion or bonding promoting additive. A separate adhesive layer or a compatibilizing "tie" layer, such as formed of a material compatible with both the materials of the layer 30 and retainer 16, also may be used between the layer 30 and retainer surface 18. In an overmolded construction, the primed or unprimed retainer 16 may be placed into a heat or unheated molded cavity for the injection, compression, or transfer molding of an curable rubber or other elastomeric material forming the layer 30. The layer 30 thereby may be formed and cured-in-place as vulcanized directly onto retainer 16. By "cured," the material may polymerized, cross-linked, further cross-linked or polymerized, vulcanized, cooled, hardened, dried, or otherwise chemically or physically changed from a liquid, semi-liquid, or other fluent form into a solid or semi-solid elastomeric or polymeric phase.

Retainer 16 as an outer perimeter, referenced at 32, which is shown to be generally rectangular but which alternatively may be of any regular geometric shape such as other polygonal, round, elliptical, or oval, or of any special or irregular shape. For most applications, the retainer outer periphery 32 will be configured to be received in or, typically, over an opening in a wall (not shown) between a first and second space, such as an opening in a vehicular firewall between the passenger and engine compartments or in a cabinet for electrical or electronic equipment or controls. On one or both sides of the wall may be an environment which typically must be sealed or otherwise contained relative to the other environment. In this regard, in the illustrative embodiment of plate 10 and as may be seen best in the view of FIG. 1, the first side 12 thereof may be formed as having a generally upstanding flange, 34, which extends along the outer periphery 32, and as having one or more holes, one of which is referenced at 36, configured to receive a bolt, screw, or other fastener (not shown) therethrough for the mounting of the plate 10 to the wall. As may be seen best in the view of FIG. 2, the plate second side 14 may be generally planar or otherwise configured to be mountable over the opening, but as may also include one or more hooks or clips, such as the pair referenced at 38a–b, for an interlocking or other interfering engagement with a corresponding edge of the opening or with a separate aperture which may be formed within the wall, as well as one or more alignment or guide pins, one of which is referenced at 39. The clips 38 may be used in addition or as an alternative to the fasteners for the mounting of the plate, which in general may be mounted using a variety of mechanical fasteners or interference-type arrangements.

For effecting a face or other seal between the plate 10 and the opening, the retainer second surface 20 may be formed as having one or more grooves, one of which is referenced at 40, which may extend generally along the plate outer perimeter 32 as disposed inwardly thereof, and as having a generally closed geometry which may be configured to surround the opening. A seal element, 42, which may be of the same or different elastomeric material as layer 30, may be formed or otherwise mounted within the groove 40 as a single or double hemispherical bead or, as shown, a generally triangular or V-shaped profile (see FIG. 7), or other profile or shape so as to define a bearing surface which extends out of the groove 40 beyond the retainer surface 20 so as to be compressible against the wall for forming a fluid-tight seal between the wall and the plate 10. Depending upon the material of construction of retainer 16, the groove 40 may be molded, machined, stamped, or otherwise formed therein the surface 20, with the seal element 42 being molded or otherwise formed-in-place therein or, alternatively, as molded or otherwise formed and adhesively bonded, interference fit, or otherwise mounted within groove 40 in separate operations. Preferably, the seal element 42 may be formed together with the elastomeric layer 30, and of the same elastomeric material as layer 30, in a single molding operation.

Depending upon the application, the seal element 42 may be used to effect a hermetic seal which may be especially useful in petrochemical and other applications to control the fugitive emission of VOC's and other pollutants. In basic construction, gaskets of the type herein involved are formed of a relatively compressible, annular seal member having a central aperture configured for registration with the corresponding margins of a pair of mating surfaces. Molded-in-place and retainer-mounted seals are also shown, for example, in U.S. Pat. Nos. 3,195,906; 3,215,442; 3,259,404; 3,578,346; 3,635,480; 3,720,420; 3,746,348; 4,026,565, and 4,625,978, and are marketed commercially by the O-Seal Division of Parker-Hannifin Corporation, San Diego, Calif., under the tradenames "Gask-O-Seal" and "Integral Seal."

Figure 4:
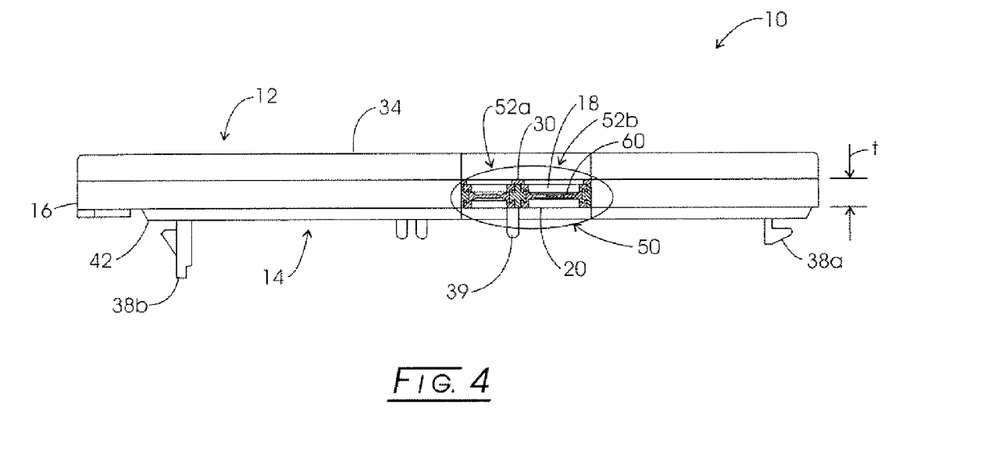
FIG. 4 is a cross-section view of the plate of FIG. 1 taken through line 4—4 of FIG. 3.
Figure 5:
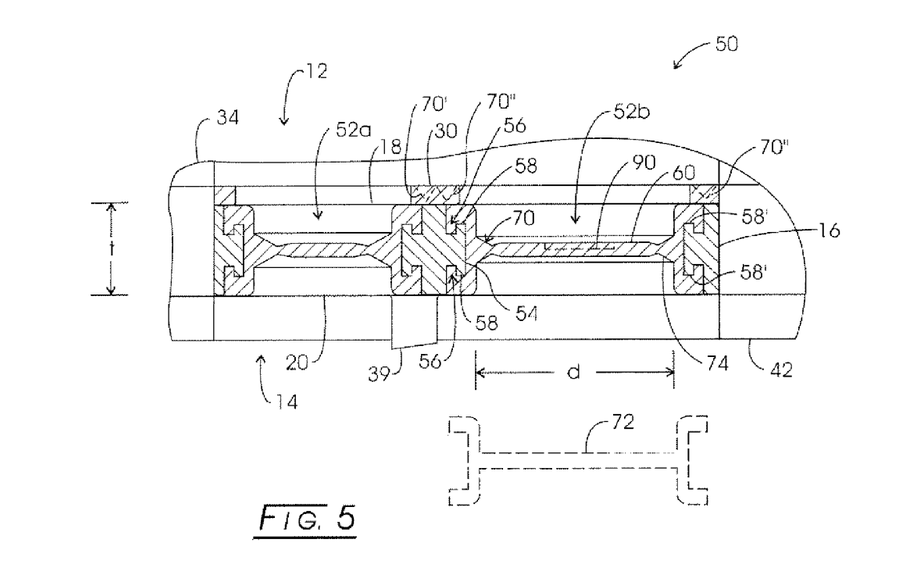
FIG. 5 is a magnified view of a region of FIG. 4.

With reference now to FIG. 3, and looking additionally to the cross-sectional view of FIG. 4 and to the detail referenced at 50 thereof shown in enhanced detail in FIG. 5, it may be seen that the retainer first and second surfaces 18 and 20 together define a thickness dimension, referenced at "t" in FIGS. 4–5 of the retainer 16 therebetween. At least one and, typically, two or more or a multiplicity of ports, one of which is referenced at 52 in FIG. 3, and others of which are referenced at 52a-b in FIGS. 3–5 and at 52c in FIG. 3, are formed through the thickness dimension t. As may be seen best in the top view of FIG. 3, each of the ports 52 may be of the different or same inner diametric extent, commonly referenced at "d" in the several views shown in the figures, which may be configured to receive the outer periphery of one or more of the same or different members therethrough. For example, the ports 52 having the same diameter may each receive one of the same tubing member therethrough, or one such tubing member may be inserted through a select one of the ports 52 such as for admitting the tubing to a select location through the plate 10. Likewise, the ports 52 having different diameters may receive different members therethrough. Although each of the ports 52 are shown to have the same generally circular geometry, the ports 52 may be formed of the same or different geometries which may be of another regular shape such as polygonal, oval, or elliptical, or of an irregular shape having extents which may be commonly referred to "diametric."

With reference now particularly to the magnified cross-sectional view of FIG. 5, and as shown for the port 52b, ports 52 may be formed as having an inner surface, 54, extending circumferentially around the diametric extent d, and further may be formed with a surrounding groove, commonly referenced at 56, extending thereinto from one or both of the retainer surfaces 18 and 20. The grooves 56, which may be half or full, may be of any cross-sectional profile such as U- or L-shape, dovetail, conical, polygonal, or like, also may include additional walls such as that referenced at 58.

Referring now again to the perspective view of FIG. 1, and with additional reference to the top view of FIG. 3 and the cross-sectional views of FIGS. 4–5, in the illustrative embodiment of plate 10, elastomeric layer 30 may be seen to be relatively thin, at least as compared to the retainer thickness t, and to cover substantially the entirety of the surface 18 in extending across each of the ports 52. It should be appreciated, however, that layer 30 may be provided to extend over only a portion of the surface 18, and across one or any number of the ports 52. As extending across the ports 52, layer 30 is formed as having one or more imperforate portions, commonly referenced at 60, each of which functions to close a corresponding one of the ports 52. For the purposes, however, of passing one or more members from the plate first side 12 to the plate second side 14, or vice versa, at least one or each of the imperforate portions 60 is made to be openable for receiving the outer periphery of the member through the inner diametric extent of the associated port 52.

In this regard, and with reference now to the port embodiments 52a–b and particularly to the magnified view of FIG.

5, in forming the imperforate portion 60 across the ports 52a–b, layer 30 may be provided to extend at least partially into the ports 52 such as along the inner surface 54 thereof, and also may substantially fill one or, as shown, both of the grooves 56. It will be appreciated that the filling of the grooves 56 by the layer 30, along with the thus embedded walls 58, assists in the development of an interfering mechanical engagement between the layer 30 and retainer 16 and, such as in the case of a fusion, chemical, or adhesive bonded layer 30, increased surface area attachment. Such engagement and/or attachment advantageously assists in the resisting of shear, tensile, or other forces or loads which may have the tendency to cause the delamination or other separation of the layer 30 from the retainer surface 18.

Within the thickness dimension t of the ports 52a–b, imperforate portion 60 extends across the diametric extent d of the port inner surface 54. For the portion 60 to be removable or otherwise openable for the opening of the corresponding one of the ports 52a–b, layer 30 may be formed as having a score, 70, which may be provided as a continuous or interrupted, generally annular cut or section made or formed partially into the thickness of the layer 30 or, as shown, a localized thinning of the thickness of the material of the layer 30, such that the portion 60 is openable by separation of the layer 30 along the score 70. In the case of a score 70 which partially surrounds the portion 60, such portion may remain attached to the layer such as in the form of a flap. Alternatively, in the case of a score 70 which substantially completely surrounds the portion 60, such portion may "pop-out" or otherwise fully detach from the layer 30. The score may be separated by the thrusting of the member itself through the port 52 or, alternatively, using a tool or other means.

Score 70 is shown in FIG. 5 to extend within the diametric extent d of the ports 52. Alternatively, and as is shown in FIG. 5 at 70', score 70 may be formed to extend outside of the diametric d or, as is shown at 70", generally coterminously therewith. With walls 58 removed, such as shown in phantom at 58', and with scores 70' or 70" being provided, the portions of the layer 30 on the inner surface 54 and within the grooves 56 also may be made to detach with the imperforate portion 60, such as in the form of the plug which is referenced in phantom at 72.

Figure 5A:
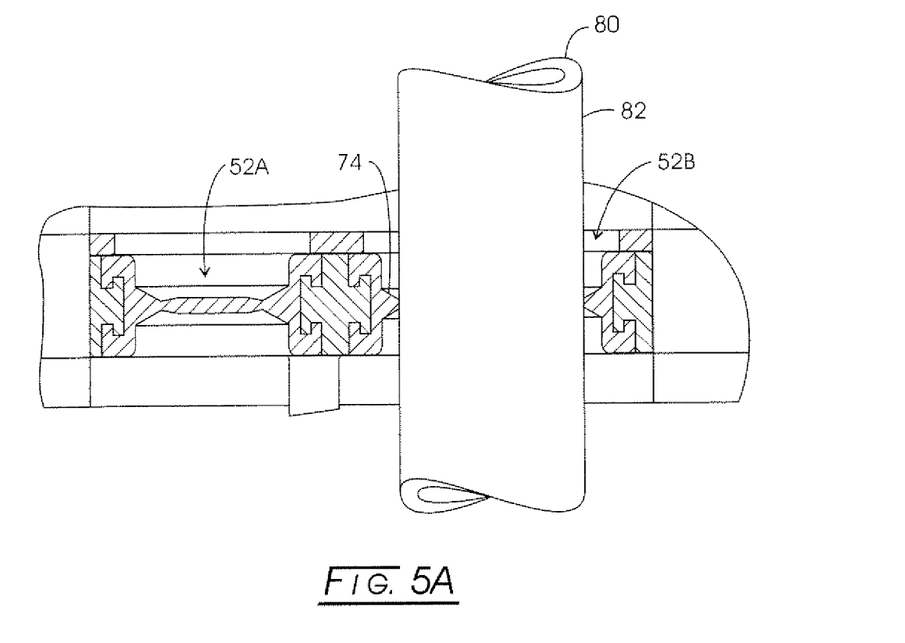
FIG. 5A is a view as in FIG. 5 showing illustrating the self-sealing feature of the invention.

As is shown at 74, the layer 30 which surrounds the score 70 may be of an increased thickness and/or profiled, or otherwise formed or provided as a seal portion which extends around a corresponding one of the ports 52a–b, such as within the diametric extent d thereof. With reference now momentary to FIG. 5A, it may be seen that, with the imperforate portion 60 having been separated along the score 70, such as by the thrusting therethrough the port 52b of a tube or other member, referenced at 80, seal portion 74 may be made to remain to forma fluid-tight perimeter seal about the outer periphery, referenced at 82, of the member 80. In this regard, the plate 10 of the invention advantageously may be made to be self-sealing.

Figure 5B:
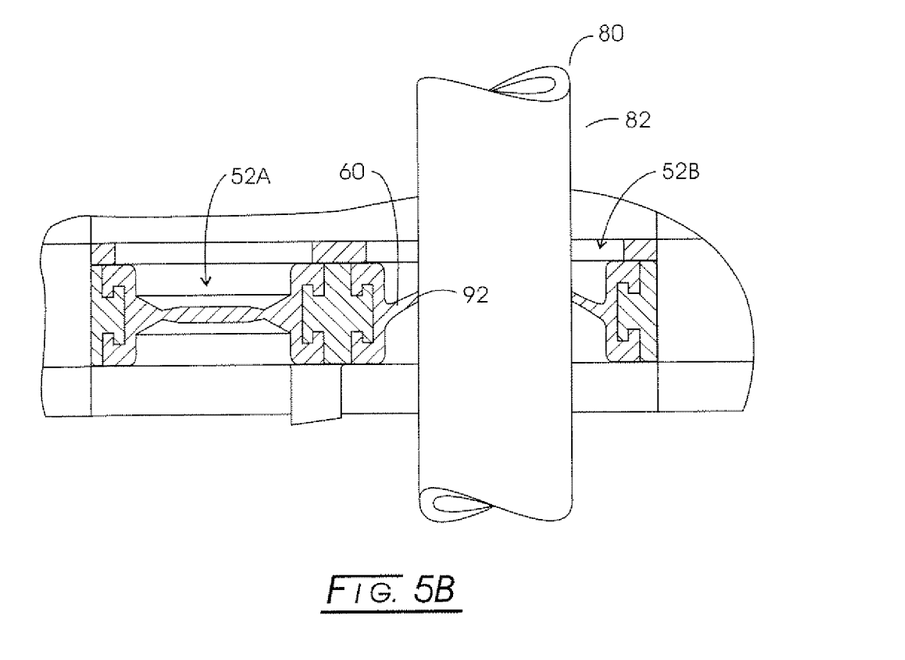
FIG. 5B is a view as in FIG. 5B showing an alternative embodiment of the self-sealing feature of the invention.

Returning to FIG. 5, imperforate portion 60 alternatively may be opened by the provision of a membrane portion, referenced at 90, which may be centrally or otherwise formed within the portion 60 as a circular or other shape localized region of thinned material thickness. As may be seen with reference now momentarily to FIG. 5B, with the membrane portion 90 having been penetrated, such as again by the thrusting therethrough the port 52b of tube 80, a fluid-tight perimeter seal may be developed around the tube periphery 82 by the edge, 92, of the opening formed in the imperforate portion 60 though the membrane portion 90 which may remain attached to, or be detached from, the remainder of the portion 60. Again, in this way, the plate 10 of the invention advantageously may be made to be self-sealing.

Figure 6:
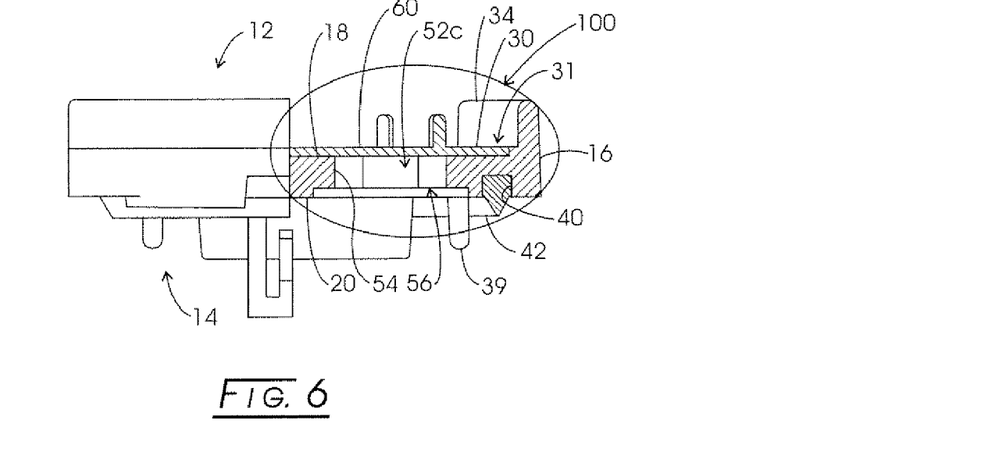
FIG. 6 is another cross-sectional view of the plate of FIG. 1 taken through line 6—6 of FIG. 3.
Figure 7:
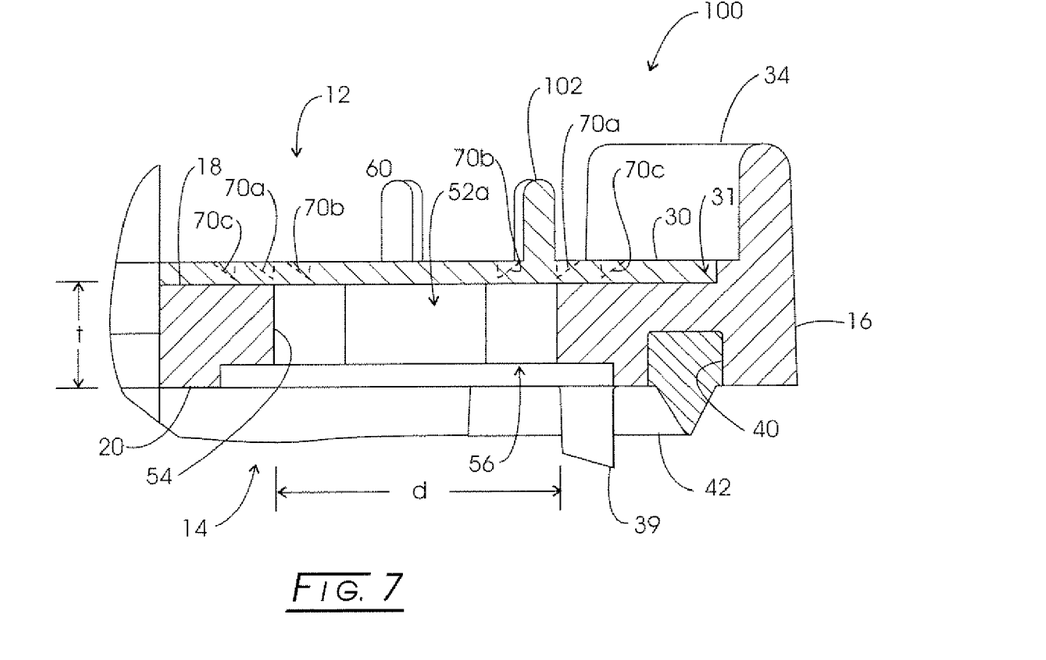
FIG. 7 is a magnified view of a region of FIG. 6.

Considering lastly the port embodiment 52c, reference now may be had to the cross-sectional views of FIG. 6, and particularly to the detail referenced at 100 which is shown in enhanced detail in FIG. 7, wherein layer 30 may be seen to similarly extend across the ports 52c in forming the imperforate portion 60 over the inner diametric extent d thereof for the closing of the port. As before, for the portion 60 to be removable or otherwise openable for the opening of the corresponding one of the ports 52c, layer 30 may be formed as having a score 70, now referenced at 70a, which again may be provided as a continuous or interrupted, generally annular cut or section made or formed partially into the thickness of the layer 30 or, as shown, a generally V-shaped or other localized thinning of the thickness of the material of the layer 30, such that the portion 60 is openable by separation of the layer 30 along the score 70a. In the case of a score 70a which partially surrounds the portion 60, such portion may remain attached to the layer such as in the form of a flap. Alternatively, in the case of a score 70a which substantially completely surrounds the portion 60, such portion may "pop-out" or otherwise fully detach from the layer 30. The score may be separated by the thrusting of the member itself through the port 52 in the manner described in connection with FIGS. 5A and 5B, or, alternatively, manually torn away such as by using an integral pull tab, 102, which may be molded or otherwise formed within the layer 30.

Score 70a is shown in FIG. 7 to extend substantially coterminously within the diametric extent d of the ports 52. Alternatively, and as is shown in FIG. 7 at 70b and 70c, score 70 may be formed to extend inside (70b) or outside (70c) of the diametric d. In this regard, and as was described hereinbefore in connection with ports 52a–b, a seal portion may be defined around the port 52c either coterminously with (score 70a) or inside (score 70b) or outside (score 70c) of the diametric extent d thereof. As before, such seal portion, such as in the case of an inner seal portion, may be used to form a perimeter seal about the outer periphery of the member being received therethrough the port 52c. Alternatively, such as in the case of an outer or coterminous seal portion, such seal portion may be used to provide a face seal, such as for a flange, washer, or other part of the member.

Thus, a pass-through plate construction in accordance with the present invention is described which eliminates the necessity for hand labor in its manufacture, or otherwise the need for secondary assembly operations. The over-molded design thereof also is robust and reliable in allowing for a chemical, fusion, adhesive, and/or mechanical bond between the layer 30 and the retainer 16. Moreover, in utilizing the self-sealing feature of the invention, the contact area between the seal portion and the member received through the port may be minimized to reduce friction and drag on the outer periphery of the member and to afford correspondingly easier insertion of the member through the plate. The construction of the invention also eliminates the need for large flange areas, such as may be required between a grommet or other insert and the port, and thereby allows for more ports to be provided within a given plate area. Additionally, such grommets typically are unidirectional, while the construction of the present invention offers increased flexibility and design options in allowing for the members to be inserted through either side of the plate.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. A plate for passing at least a first member from a first side of the plate through to a second side of the plate, the member having an outer periphery and said plate comprising:
   a retainer having a first surface on the first side of the plate, and a second surface on the second side of the plate, the retainer first and second surface defining a thickness dimension of the retainer therebetween, and the retainer having one or more ports formed through the thickness dimension thereof, at least a first one of the ports having an inner diametric extent configured to receive the outer periphery of the first member therethrough, and the retainer having an outer perimeter configure to be received over an opening in a wall between a first space and a second space, the second side of the plate being mountable over the opening;
   a layer of an elastomeric material extending on the first surface of the retainer across at least a first and a second one of the ports, the layer being formed as having a first imperforate portion closing the first one of the ports which first imperforate portion is operable for receiving the outer periphery of the first member through the inner diametric extent of the first one of the ports, and the layer being further formed as having a second imperforate portion closing the second one of the ports; and
   a seal disposed on the second side of the plate opposite the layer of elastomeric material, the seal being configured as having a generally closed geometry configured to surround the opening and being compressible between the plate and the wall for forming a fluid-tight seal between the plate and the opening.

2. The plate of claim 1 wherein the layer is further formed as having a seal portion which extends around the first one of the ports for the fluid-tight sealing thereof after the imperforate portion has been opened.

3. The plate of claim 2 wherein the seal portion extends around the first one of the ports within the inner diametric extent thereof for scaling around the outer periphery of the first member as the first member is received through the first one of the ports.

4. The plate of claim 2 wherein the seal portion extends around the first one of the ports outside of the inner diametric extent thereof.

5. The plate of claim 1 wherein:
   the second one of the ports as an inner diametric extent configured to receive the outer periphery of the first member therethrough; and
   the second imperforate portion is openable for receiving the outer periphery of the first member through the inner diametric extent of second one of the ports.

6. The plate of claim 1 wherein:
   the second one of the ports has an inner diametric extent configured to receive the outer periphery of a second member the same or different from the first member therethrough; and
   the second imperforate portion is openable for receiving the outer periphery of the second member through the inner diametric tent of second one of the ports.

7. The plate of claim 1 wherein the layer extends on substantially the entirety of the first surface of the retainer.

8. The plate of claim 1 wherein the layer is formed as having a score extending around at least a portion of the first imperforate portion, the first imperforate portion being openable by separating the layer along the score.

9. The plate of claim 8 wherein the score extends around at least a portion of the first imperforate portion within the inner diametric extent of the first one of the ports.

10. The plate of claim 1 wherein the layer is further formed as having a membrane portion within the first imperforate portion, the first imperforate portion being openable by penetration of the membrane portion by he first member.

11. The plate of claim 10 wherein the first imperforate portion seals around the out periphery of the first member upon the penetration of the membrane portion by the first.

12. A plate for passing at least a first member from a first side of the plate through to a second side of the plate, the member having an outer periphery and said plate comprising:
   a retainer having a first surface on the first side of the plate, and a second surface on the second side of the plate, the retain first and second surface defining a thickness dimension of the retainer therebetween, and the retainer having one or more ports formed through the thickness dimension thereof, at least a first one of the ports having an inner diametric extent configured to receive the outer periphery of the first member therethrough, and the retainer having an outer perimeter configure to be received over an opening in a wall between a first space and a second space, the second side of the plate being mountable over the opening;
   a layer of an elastomeric material extending on the first surface of the retainer across at least the first one of the ports, the layer being formed as having a first imperforate portion closing the first one of the ports which first imperforate portion is openable for receiving the outer periphery of the first member through the inner diametric extent of the first one of the ports, and the layer being further formed as having a score extending around at least a portion of the first imperforate portion outside of the inner diametric extent of the first one of the ports, the first imperforate portion being openable by separating the layer along the score; and
   a seal disposed on the second side of the plate opposite the layer of elastomeric material, the seal being configured as having a generally closed geometry configured to surround the opening and being compressible be between the plate and the wall for forming a fluid-tight seal between the plate and the opening.

13. A plate for passing at least a first member from a first side of the plate through to a second side of the plate, the member having an outer periphery and said plate comprising:
   a retainer having a first surface on the first side of the plate, and a second surface on the second side of the plate, the retainer first and second surface defining a thickness dimension of the retainer therebetween, and the retainer having one or more ports formed through the thickness dimension thereof, at least a first one of the ports having an inner diametric extent configured to receive the outer periphery of the first member therethrough, and the retainer having an outer perimeter configure to be received over an opening in a wall between a first space and a second space, the second side of the plate being mountable over the opening;

a layer of an elastomeric material extending on the first surface of the retainer across at least the first one of the ports, the layer being formed as having a first imperforate portion closing the first one of the ports with first imperforate portion is openable for receiving the outer periphery of the first member through the inner diametric extent of the first one of the ports, and the layer being further formed as having a score extending around at least a portion of the first imperforate portion generally coterminously with the inner diametric, extent of the first one of the ports, the first imperforate portion being openable by separating the layer along the score; and a seal disposed on the second side of the plate opposite the layer of elastomeric material, the seal being configured as having a generally closed geometry configured to surround the opening and being compressible between the plate and the wall for forming a fluid-tight seal between the plate and the opening.

14. A plate for passing at least a first member from a first side of the plate through to a second side of the plate, the member having an outer periphery and said plate comprising:

a retainer having a first surface on the first side of the plate, and a second surface on the second side of the plate, the retained first and second surface defining a thickness dimension of the retainer therebetween, and the retainer having one or more ports formed through the thickness dimension thereof, at least a first one of the ports having an inner diametric extent configured to receive the outer periphery of the first member therethrough and being formed as having an inner surface extending around the inner diametric extent thereof, and the retainer having an outer perimeter configure to be received over an opening in a wall between a first space and a second space, the second side of the plate being mountable over the opening;

a layer of an elastomeric material extending on the first surface of the retainer across at least the first one of the ports, the layer being formed as having a first imperforate portion closing the first one of the ports which first imperforate portion is openable for receiving the outer periphery of the first member through the inner diametric extent of the first one of the ports, the layer extending at least partially into the first one of the ports on the inner surface thereof, and the first imperforate portion extending within the first one of time ports across the inner surface thereof; and a seal disposed on the second side of the plate opposite the layer of elastomeric material, the seal being configured as having a generally closed geometry configured to surround the opening and being compressible between the plate and the wall for forming a fluid-tight seal between the plate and the opening.

15. The plate of claim 14 wherein the layer is formed as having a score extending around at least a portion of the first imperforate portion within the inner diametric extent of the first one of the ports, the first imperforate portion being openable by separating the layer along the score.

16. The plate of claim 15 wherein the layer is further formed as having a generally annular seal portion which extends around the inner surface of the first one of the fluid ports outside of the score for sealing around the outer periphery of the first member as the first member is received through the first one of the ports.

17. The plate of claim 14 wherein the first surface of the retainer is formed as having a first groove extending into the first fluid port about the inner surface thereof, the layer substantially filling the first groove to mechanically bond the layer to the first surface.

18. The plate of claim 14 wherein at least the second surface of the retainer is formed as having a second groove extending into the first fluid port about the inner surface thereof, the layer substantially, filling the second groove to mechanically bond the layer to the second surface.

19. The late of claim 14 wherein the layer is formed as having a score extending around at least a portion of the first imperforate portion outside of the inner diametric extent of the first one of he ports, the first imperforate portion being openable by separating the layer along the score.

20. The late of claim 14 wherein the layer is formed as having a score extending around at least a portion of the first imperforate portion generally coterminously with the inner diametric extent of the first one of the ports, the first imperforate portion being openable by separating the layer along the score.

* * * * *